United States Patent [19]
Ladouceur et al.

[11] 3,724,520
[45] Apr. 3, 1973

[54] NUT AND PANEL ASSEMBLY

[76] Inventors: Harold A. Ladouceur; John H. Steward, both of 12668 Arnold Avenue, Detroit, Mich. 48239

[22] Filed: Nov. 19, 1970

[21] Appl. No.: 90,923

Related U.S. Application Data

[63] Continuation-in-part of Ser. No. 841,037, July 11, 1969, abandoned.

[52] U.S. Cl. ................................ 151/41.73, 29/432
[51] Int. Cl. ........................................... F16b 39/34
[58] Field of Search ......... 151/41.73, 41.72; 85/32 K; 285/202; 29/432, 432.1, 432.2, 506, 522, 523

[56] References Cited

UNITED STATES PATENTS

| | | | |
|---|---|---|---|
| R15,413 | 7/1922 | Reynolds | 285/202 |
| 2,043,101 | 6/1936 | Jesser | 285/202 |
| 3,253,631 | 5/1966 | Reusser | 151/41.73 |
| 3,282,315 | 11/1966 | Zahodiakin | 151/41.73 |
| 3,282,317 | 11/1966 | Zahodiakin | 151/41.73 |
| 3,299,500 | 1/1967 | Double | 151/41.73 |
| 3,469,613 | 9/1969 | Steward | 151/41.73 |

*Primary Examiner*—Marion Parsons, Jr.
*Attorney*—Cullen, Settle, Sloman and Cantor

[57] ABSTRACT

A pierce nut having a panel metal receiving groove especially designed to achieve improved panel retention characteristics. The panel metal receiving groove of the nut is formed with an undercut outer side wall, and the groove bottom at the inner wall is deeper than at the outer wall, defining a tool receiving recess at the inner wall. A piercing tool having a bevel or ramp surface at its outer edge forces the panel metal inwardly into underlying relationship with the undercut outer groove wall during the piercing operation, securely interlocking the nut and panel.

20 Claims, 19 Drawing Figures

INVENTORS
HAROLD A. LADOUCEUR.
BY   JOHN H. STEWARD.
CULLEN, SETTLE, SLOMAN & CANTOR.
ATT'YS.

INVENTORS
HAROLD A. LADOUCEUR.
JOHN H. STEWARD.
BY CULLEN, SETTLE, SLOMAN & CANTOR
ATT'YS.

NUT AND PANEL ASSEMBLY

This application is a continuation-in-part application of Ser. No. 841,037 filed July 11, 1969 now abandoned.

The present invention is especially directed to pierce nuts of the type designed to provide for a flush installation in a panel — i.e. where the installed nut projects from only one surface of the panel. Nuts and installations of this general type are disclosed in U.S. Pat. Nos. 3,299,500, 3,314,138 and 3,315,345. These patents in general disclose pierce type nuts for flush mounted installations in which the nut is either formed with an undercut groove or in which metal from the nut is staked and folded over the panel metal. In the prior art arrangements in which an undercut groove is employed, as in U. S. Pat. No. 3,315,345, the forcing of the panel metal into the undercut portions of the grooves is accomplished by deforming the panel metal under pressure sufficient to cause the metal to flow. Because of the fact that the sheet metal with which nuts of this type are employed has a permissable variation in thickness, the retention characteristics of such an arrangement can vary considerably with variations in panel thickness because of variations in the volume of metal displaced in the flowing of the metal. Where primary reliance for retention is placed on a staking of a portion of the pilot into overlying relationship with metal in the groove, the retention is dependent upon the amount of metal staked from the pilot, and this arrangement frequently requires an undesirable compromise between achieving adequate retention while at the same time avoiding distortion of the nut threads.

The present invention is designed to avoid the foregoing problems in that panel metal is forced into an undercut wall of the groove by force applied solely in a direction away from the thread cylinder during the piercing operation to achieve positive retention without having to rely on flowing of the metal and without thread distortion.

In the presently disclosed embodiment of the invention, the outer side wall of the groove — i.e. the wall most remote from the tapped bore — diverges from the axis of the bore in its inward extent to provide an undercut retaining surface for the groove. The inner side wall of the groove is preferably parallel to the nut axis. The bottom of the groove, hereinafter referred to as the abutment wall, is deeper at the inner side wall to define a tool receiving recess which receives the tip of the piercing tool such that the end of the tool bottoms in the groove rather than against the panel. The tip of the tool has a bevel or chamfer at its outer surface and the thickness of the tool is preferably less than the width of the groove. During the piercing operation, the inner side of the tool travels down the inner side wall of the groove to shear the panel, while the beveled or chamfered outer surface acts as a wedge forcing the sheared metal panel edge outwardly into engagement with the undercut inclined outer wall of the groove. Because of the configuration of the groove, the tool can pass inwardly beyond the abutment surface for the panel edge, the panel metal is positively forced by the wedging action into the undercut region of the groove. The depth to the abutment surface for the panel at the outer side wall is somewhat less than the width of the groove. The panel metal, which is depressed into the groove, may be compressed against the abutment surface of the abutment wall or, more commonly, is folded upon itself to extend beneath the beveled outer surface.

The abutment wall in one of the disclosed embodiments of the invention includes a distinct abutment surface for the deformed panel edge which is generally parallel to the end surface of the nut body which is received against the panel prior to piercing. In this embodiment, the tool receiving recess is defined by a beveled wall extending inwardly from the abutment surface to a bottom wall which extends to the inner side wall of the groove. The bottom wall of the tool receiving recess is at a depth in the groove greater than the width of the groove at the end surface of the nut body and the depth of the abutment surface adjacent the outer side wall is less than the width of the groove. The abutment wall in the other embodiment is defined by a beveled wall inclined inwardly from the outer side wall of the groove to the inner side wall. The depth of the abutment wall at the inner side wall in this embodiment is also greater than the width of the groove at the end surface of the nut body, defining a tool receiving recess, and the depth of the abutment wall at the outer side wall is less than the width of the groove.

Other objects, advantages and meritorious features of this invention will become apparent by reference to the following specification and to the drawings.

IN THE DRAWINGS

DESCRIPTION OF THE PREFERRED EMBODIMENTS

Figure 1:
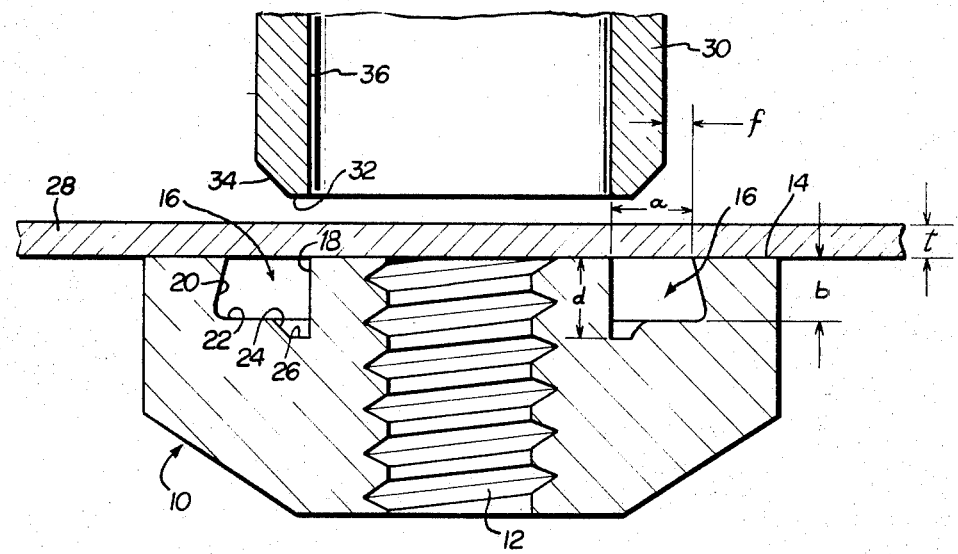
FIG. 1 is a cross sectional view of one form of nut embodying the present invention, showing the nut positioned beneath a panel with the piercing tool about to begin its downward stroke.
Figure 2:
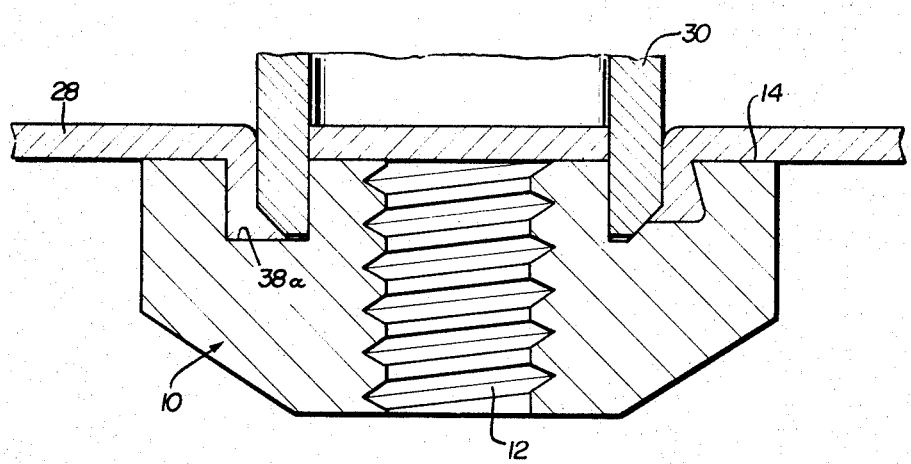
FIG. 2 is a view similar to FIG. 1, showing the nut and piercing tool at the conclusion of the piercing stroke.

Referring first to FIGS. 1 and 2, there is shown in cross section a nut body designated generally 10 having a centrally located tapped bore 12. The upper or panel engaging end surface 14 of the nut is flat and is grooved as generally indicated at 16 on opposite sides of the tapped bore 12.

Figure 3:
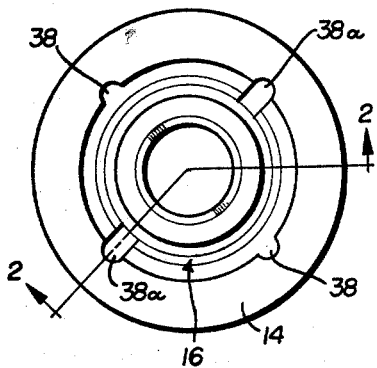
FIG. 3 is an end elevational view of one form of nut employing the grooved configuration of FIGS. 1 and 2.
Figure 4:
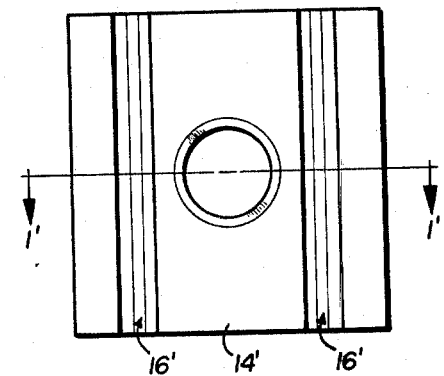
FIG. 4 is an end elevational view of a nut of square configuration embodying the invention.

Referring briefly to FIGS. 3 and 4, the nut shown in FIGS. 1 and 2 will be assumed to be the circular nut of FIG. 3, with FIGS. 1 and 2 being taken approximately at the section line indicated at 2—2 however, it is believed apparent that the cross sectional view of FIG. 1 might equally well have been taken on the section line 1'—1' of FIG. 4, the reference numerals 14' and 16' of FIG. 4 representing the flat end surface 14 and the grooves 16 of FIG. 1.

Returning to FIGS. 1 and 2, the groove 16 is defined by an inner side wall 18 which extends parallel to the axis of bore 12 and an outer side wall 20 which diverges from inner side wall 18 in its extent inwardly from end surface 14. At the bottom of outer wall 20, in this embodiment, a flat abutment surface 22, parallel to end surface 14 of the nut body extends across approximately one-half of the width of groove 16 to a bevel surface 24 inclined inwardly toward the nut axis at an angle of approximately 45° to terminate at a flat bottom surface 26. The surfaces 24 and 26, and the lower portion of inner wall 18 cooperatively define a recess at the bottom of groove 16 which extends inwardly of the nut body to a depth greater than that of the abutment surface 22.

In FIG. 1, the nut is supported from beneath by an anvil, not shown, and a sheet metal panel 28 is supported upon the nut in face-to-face engagement with end surface 14, again by suitable means, not shown. Spaced above panel 28 is shown the lower end of a hollow piercing tool 30 whose tip is defined by an annular flat surface 32 at the inner side of the tool and a beveled surface 34, inclined upwardly at a 45° angle. Tool 30 is of hollow, annular construction having an inner wall surface 36 of a diameter, in the circular nut configuration of FIG. 3, slightly greater than the diameter of the inner groove wall 18. The width of the flat annular bottom surface 32 of the tool is slightly smaller than the width of the flat bottom wall 26 defining the bottom of the recess in the grooves so that the tool can be driven into the groove until surface 32 of the tool contacts surface 26 of the nut.

Referring now to FIG. 2, the tool is shown at the conclusion of its piercing stroke, with the lower end of the tool being received in the recess defined by walls 24 and 26 of the groove. The panel metal has been mechanically forced outwardly into engagement with the inclined surface 20 of the groove and has been compressed or deformed somewhat in that the volume of the groove left after the insertion of the tool is somewhat less than the actual volume of the panel metal forced into the groove.

Referring now to FIGS. 5–10, there are shown in these figures the progressive steps in the piercing and interlocking of the panel to the nut.

Figure 5:
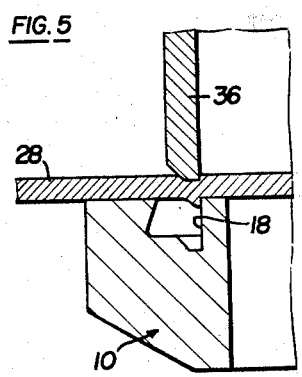
FIGS. 5, 6, 7, 8, 9 and 10 are partial cross sectional views showing successive steps in the piercing and interlocking operation.

In FIG. 5, the tip of tool 36 has just entered the panel surface, and shearing of the panel has commenced at the inner or right-hand edge of the tool tip and also at the shoulder at the upper end of inner wall 18 of the groove. At this particular stage, the only displacement of panel metal which has occurred is in the region immediately below the tool tip.

Figure 6:
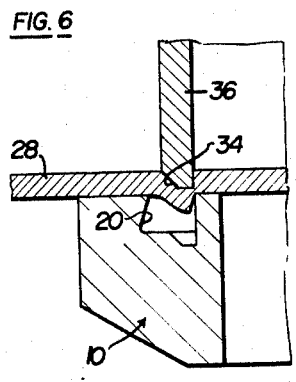

In FIG. 6, the tool tip has advanced nearly completely through the panel, and the beveled surface 34 of the tool is substantially completely in face-to-face engagement with the upper surface of the panel. The panel has been bent downwardly about the shoulder formed at the upper end of the outer wall 20 of the groove, but the panel has still retained its original thickness at all points because the closest point on the surface of the tool to the shoulder at the upper end of outer wall 20 still exceeds the thickness of the panel.

Figure 7:
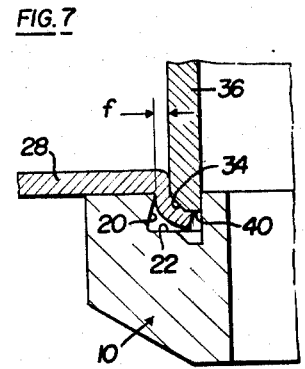

In FIG. 7, the tool has been advanced into the groove to a point at which the beveled surface 34 is now entirely within the groove. It will be noted that the difference f between the thickness of the tool 36 and the width of the groove at its opening is less than the thickness of the metal of panel 28 and that the thickness of the panel has thus been reduced between the shoulder at the upper edge of outer wall 20 and the outer surface of tool 36. The downward movement of the tool relative to the stationary nut and panel as viewed in FIG. 7 thus forceably displaces some of the panel metal during movement of the tool between the FIG. 6 and FIG. 7 positions, and the metal which is displaced is displaced by the beveled surface 34. Thus, the force tending to displace the metal acts, in general, in a direction normal to the beveled surface 34 of the tool so that the displaced metal is not only moved downwardly, as viewed in FIG. 7, into the groove, but at the same time is forced outwardly toward the outer grooved wall 20.

It will further be noted from FIG. 7 that because of the downward component of metal displacement, the upper surface of panel 28 is, in effect, stretched and drawn downwardly into the groove, resulting in a smoothly faired curved surface on the panel adjacent the outer wall of the tool.

It will be further noted from FIG. 7 that the sheared edge 40 of the panel is now in a position where it becomes apparent that further downward movement of the tool 36 will force the lower surface of the panel into engagement with abutment surface 22.

Figure 8:
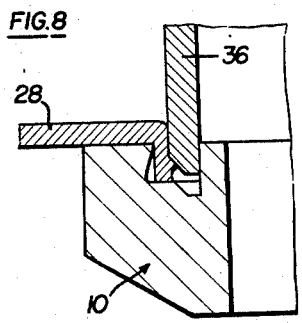

In FIG. 8, the tool 36 has advanced inwardly of the groove from its FIG. 7 position, and the lower surface of the panel has engaged abutment surface 22 and is being forced outwardly across surface 22. In effect, a reverse bend has now been created in the panel metal tending to force metal in toward the corner at the intersection of abutment surface 22 and the outer wall 20 of the groove.

Figure 9:
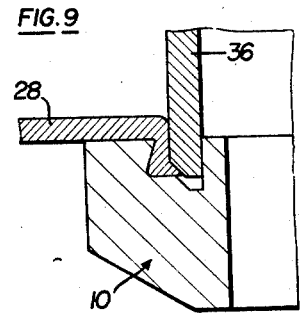

In FIG. 9, the tool has reached almost the end of its stroke, and the undercut outer wall of the groove has been substantially filled with the panel metal.

Figure 10:
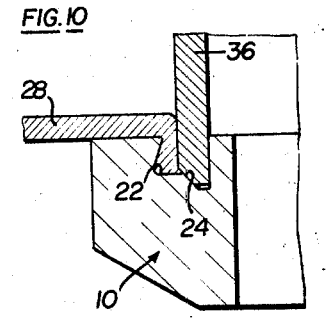

In FIG. 10, the tool has reached the end of its stroke.

The progressive steps illustrated in FIGS. 5–10 show the idealized situation in which, as shown in FIG. 10, the inner surface of the panel metal in the completed assembly forms a cylindrical surface which projects upwardly from precisely the juncture between abutment surface 22 and the inclined wall 24 of the tool receiving recess. In the case where the panel metal is slightly thicker than that illustrated in FIGS. 5–10, when the stage shown in FIG. 9 is reached, some metal will be left over and will extend downwardly along the inclined wall 24 of the tool receiving recess in the completed nut. In the event that the panel metal is slightly thinner than illustrated in FIGS. 5–10, the panel metal in the completed assembly may have a configuration more like that of FIG. 9, or even of FIG. 8. It will be noted, however, that the beveled surface 34 on the tool, positively assures that the panel metal will be forced or wedged radially outwardly into engagement with the undercut outer wall 20, regardless of whether the amount of metal in the groove is increased or decreased relative to the amount illustrated in FIGS. 5–10.

In order to accomplish this, the relative dimensions of the groove, panel and tool must be maintained within certain limits. In FIG. 1, the various dimensions have been indicated as follows:

| | |
|---|---|
| Width of groove at end surface 14 | a |
| Groove depth from end surface 14 to abutment wall 22 | b |
| Depth of groove from end surface 14 to bottom of recess at wall 26 | d |
| Panel thickness | t |
| Difference between radius of outer surface of tool 30 and outer wall 20 of groove at surface 14 | f |

The relationship between these various dimensions should be approximately as follows:

The width of groove $a$ should be greater than depth $b$ by about 10–20 percent

The depth $d$ of the groove should exceed the groove width $a$

The radial difference $f$ between the outer surface of the tool and the outer edge of groove should be approximately one-half of the maximum panel thickness $t$.

Because of variations in the panel thickness $t$, the relationships involving the panel thickness can permissably vary from those specified above. Sheet metal, as supplied to the automotive industry for example, cannot be supplied in precise uniformity of thickness, mainly for economic reasons. The ranges specified above will normally be satisfactory for panel metal of a given nominal thickness. A slight expansion of the range of panel thicknesses which may be handled for a nut of given groove dimensions can be achieved by using tools of differing wall thickness so that the dimension $f$ is regulated to remain at approximately one-half the panel thickness. If the dimension $f$ becomes much less than half the panel thickness, the panel metal as it is wrapped around the upper edge of wall 20, becomes too thin, and thus is easily sheared. If the dimension $f$ becomes much greater than half the panel thickness, the panel metal is not forced quite as firmly against wall 20, and a loss of retention or holding strength is the result.

The angle of inclination of wall 20 to the nut axis is preferably somewhere in the neighborhood of 15°. At an angle of 10°, a noticeable reduction in retention occurs, while at an angle of greater than 20°, difficulties are encountered in forcing the metal back into the undercut, thus resulting in a reduction of holding strength.

In the round nut configuration of FIG. 3, torque resistance is achieved by providing a series of notches, such as 38, in the outer wall of groove 16. The bottom of the notches may be located at the level of abutment surface 22 or, if increased torque resistance is desired, the notches may extend inwardly to the level of the recess bottom 26 as shown at 38a. Panel metal is forced into the notches 38 during the piercing operation.

The above description applies in general to the square nut embodiment of FIG. 4 in which two grooves 16' extend in parallel relationship on opposite sides of the tapped bore, the grooves being of the same cross-sectional configuration as those shown in FIGS. 1 and 2. In the case of the FIG. 4 embodiment, the tool will consist of two parallel members. The nut of FIG. 4 possesses some advantages over that of FIG. 3 in that it can be formed from rolled strip stock, but has the disadvantage of requiring orientation in some installations. The undercut in the nut of FIG. 3 is constructed by making a blank with the walls 18 and 20 of the groove initially in parallel relationship to each other with surface 14 lying on a conical surface and subsequently cold forming the nut to, in effect, bend the wall 18 into the conical relationship shown in FIGS. 1 and 2.

The retention characteristics of the annular groove embodiment of FIGS. 1 and 2 are far superior to those of the square nut of FIG. 4 insofar as resistance to forces tending to move the nut away from the panel are concerned. This is because in the case of the nut of FIGS. 1 and 2, a continuous annular band of panel metal underlies the overcut groove and the nut cannot be separated from the panel without compressing this annular band of metal around its entire circumference. In the square nut embodiment of FIG. 4, separation of the nut from the panel is opposed solely by the resistance of the panel metal to bending along the shoulder at the upper end of the inclined outer wall of the groove.

Figure 12:
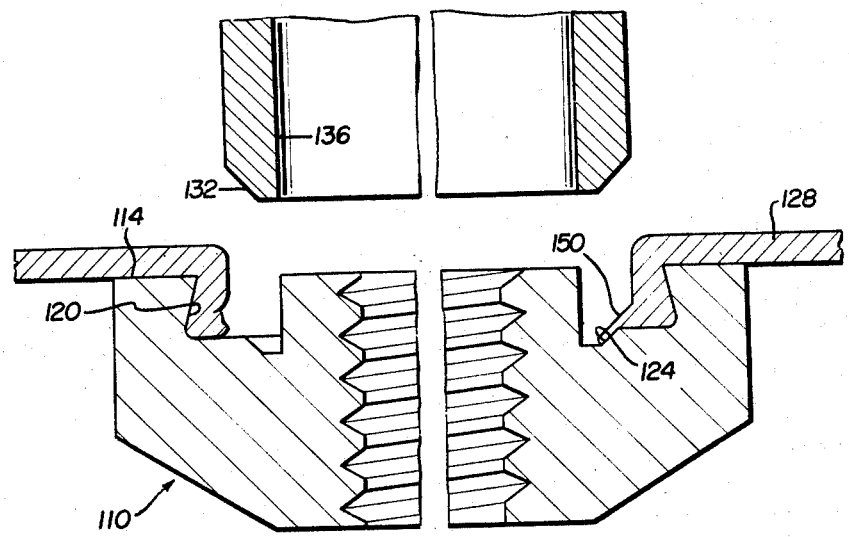
FIG. 12 is a cross sectional view taken on the line 12—12 of FIG. 11 showing the nut of FIG. 11 installed in a panel.
Figure 11:
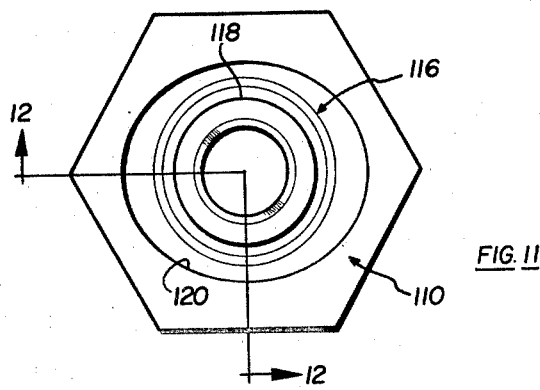
FIG. 11 is an end elevational view of another embodiment of the invention.

In FIGS. 11 and 12, there is shown another embodiment of the invention in which an annular groove 116 (FIG. 11) is formed in one face of a nut body designated generally 110 by retaining the cylindrical surface configuration of the inner wall 118 while forming the outer wall 120 in an oval or generally elliptical configuration. For purposes of illustration, the out-of-roundness of the elliptical outer wall 120 has been greatly exaggerated in FIG. 11 — in one example of a nut of the FIG. 11 type, the major diameter of the ellipse is 0.593 inch with a minor diameter of 0.562 inch. The nut of FIGS. 11 and 12 retains the advantage of not requiring orientation for installation, because the nut is installed in the panel by the use of a circular tool identical to that employed in installing the nut of FIGS. 1 and 2.

Because of the fact that the width of the groove 116 in the FIGS. 11 and 12 embodiment is not uniform, it is apparent that the general relationships of relative dimensions previously set forth is only approximated in the FIG. 11 embodiment. However, the groove, tool and panel thickness dimensions of the FIG. 11 embodiment are selected in terms of the average groove width.

A cross-sectional view of a nut of the FIGS. 11 and 12 embodiment installed in a panel 128 appears in FIG. 12, the left-hand portion of FIG. 12 showing a cross section at a position of maximum groove width, while the right-hand portion of the figure shows the cross section at a location of minimum groove width. Because a circular tool is employed, to eliminate the necessity of orienting the nut, the panel metal configuration in the installed position differs as between the minimum and the maximum groove width sections. The effect, as illustrated in FIG. 12 is similar to the effect produced by a relative increase or decrease in panel thickness previously described in connection with the progressive steps of the installation of a nut of the FIGS. 1 and 2 embodiment. As best seen in the right-hand portion of FIG. 12, where the volume of panel metal within the groove is relatively large as compared to the groove dimensions, a portion of the panel metal 150 extends down the inclined wall 124 of the tool receiving recess. At the left-hand portion of FIG. 12, where the volume of the groove is relatively large as compared to the amount of panel metal forced into the groove, the end result is a panel metal configuration which falls somewhat short of optimum filling of the undercut of the groove, however, it will be noted that even where underfilling is present, the major portion of the undercut groove wall 120 is engaged by the panel metal.

Figure 17:
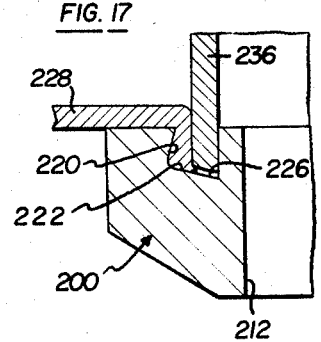
Figure 18:
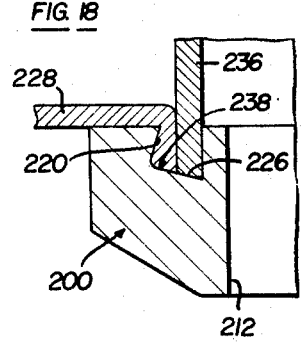
Figure 19:
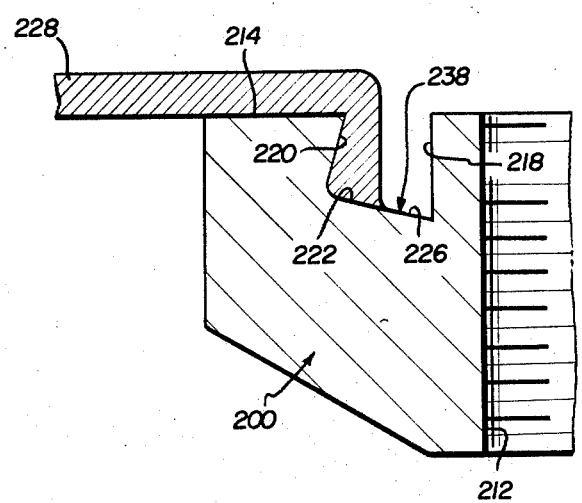
FIG. 19 is a partial cross sectional view of the embodiment shown in FIGS. 13 to 18 after securement of the panel.

The embodiment of the pierce nut 200 shown in FIGS. 13 to 19 includes a simplified groove configuration 216, however the piercing mechanism described hereinabove is substantially identical to the operation described above and shown in FIGS. 5 to 10. The groove 216 includes an inner side wall 218 parallel to the tapped bore 212 of the nut body and substantially perpendicular to the end surface 214. The outer beveled wall 220 defines an undercut surface for retention of the panel as described hereinabove. The groove bottom is defined by an abutment wall 238, which in this embodiment is inclined inwardly from the outer side wall 220 to the inner side wall 218. The abutment wall 238 at the outer wall 220 defines an abutment surface for the pierced end of the panel 228 as shown in FIG. 19. The depth of the abutment surface 222 is preferably less than the width of the groove at the end surface 214 of the nut body. Similarly, the inner surface 226 of the abutment wall defines a tool receiving recess at a depth greater than the width of the groove at the end surface 214 of the nut.

Figure 13:
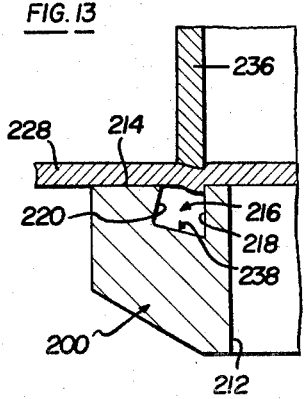
FIGS. 13 to 18 are partial cross sectional views of another embodiment of the pierce nut of this invention illustrating successive steps in the piercing and interlocking operation.

The similarity of the piercing operation is more clearly shown in FIGS. 13 to 18, wherein the piercing tool 236 has just entered the panel surface 228 in FIG. 13. It will be noted that the piercing tool 236 in this embodiment is configured to mate with the tool receiving recess 226 of the groove and therefore the chamfered end 232 is defined at a smaller angle relative to the surface of the panel 228.

Figure 14:
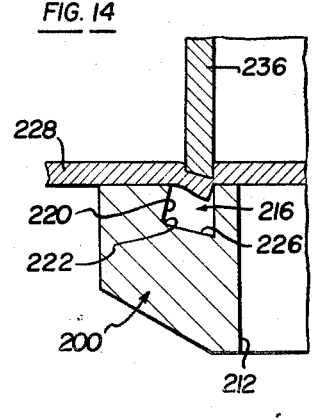
Figure 15:
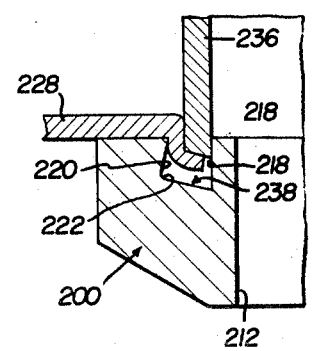
Figure 16:
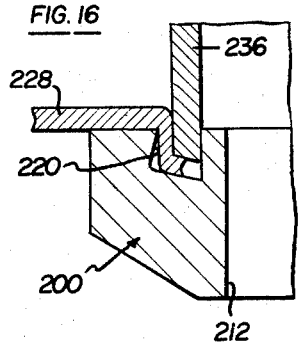

In FIG. 14, the tool tip has advanced almost completely through the panel, and the chamfered or beveled end 232 of the piercing tool is starting to bend the pierced end of the channel outwardly and downwardly as shown in FIG. 15. The pierced end of the panel is then forced against the abutment surface of the bottom wall 226 as shown in FIG. 16 and finally into the corner defined by the outer side wall 220 and the abutment wall 226 as shown in FIG. 17. The beveled end 232 finally bottoms in the tool receiving recess 226 as shown in FIG. 18.

It can be seen from FIG. 19 that the configuration of the pierced end of the panel 228 is substantially the same as the configuration of the panel after piercing the embodiment shown in FIG. 10, for example. The metal has been forced beneath the beveled outer side wall 220 to securely lock the panel in the groove and the thickness of the panel has been reduced as described hereinabove. It will be understood however that the thickness of the panel 228 must be more closely controlled in the embodiment of the pierce nut shown in FIG. 19, however this embodiment may be preferred in certain applications.

The drawings disclose three nut and groove configurations, including the circular configuration of FIG. 3 having radial grooves 38 preventing rotation of the nut, after assembly, the square nut of FIG. 4 having linear grooves and the hexagonal nut of FIG. 11 having an oval or elliptical outer side groove wall. It will be understood however that various other groove and nut configurations may also be utilized without departing from the purview of the following claims. We have found, for example, that a hexagonal nut having a coaxially aligned hexagonal groove configuration including hexagonal inner and outer side walls may be preferred in certain applications. In the latter embodiment, the hexagonal groove prevents rotation of the nut and provides excellent retention of the nut in the panel.

I claim:

1. A nut adapted to be secured to a sheet metal panel having a thickness falling within a known range comprising a nut body having a flat panel engaging end surface and a tapped bore extending through the nut body along an axis normal to said flat end surface, means defining a panel metal receiving groove extending into said nut body from said flat end surface at opposite sides of said tapped bore, the groove having an inner side wall at the side of the groove adjacent the tapped bore extending inwardly of said nut body in perpendicular relationship to said flat end surface to a depth greater than the width of said groove, the opposite side of the groove being defined by an outer side wall extending inwardly from said flat end surface in divergent relationship to said inner wall at an angle between 10 and 20 degrees and terminating at a flat abutment wall parallel to the flat end surface of the nut body at a depth less than the width of said groove, said abutment wall defining approximately the outer half of the bottom of the groove, the remaining portion of the bottom of the groove being defined by a recess extending inwardly of said nut body from said abutment wall between the abutment wall and inner wall of the groove.

2. A nut as defined in claim 1 wherein said recess is defined by a beveled wall inclined inwardly from said abutment wall toward said inner wall, and a flat bottom wall extending between said inner wall and said beveled wall.

3. A nut as defined in claim 1 wherein said groove is of an annular configuration of uniform width concentric with said tapped bore, and a plurality of circumferentially spaced notches in said outer wall of said groove.

4. A nut as defined in claim 1 wherein the inner wall of said groove is a cylindrical surface coaxial with said tapped bore, and the outer wall of said groove at said flat end surface is of an oval configuration.

5. An interlocked nut and panel assembly comprising a nut body having a tapped bore and a flat end surface normal to the axis of said bore, means defining a groove in said nut body opening at said flat end surface on opposite sides of said bore, the wall of the groove adjacent said bore being normal to said end surface and the wall of the groove remote from the bore diverging from the bore in its extent inwardly of said body from said end surface, the bottom of the groove being defined in part by a flat abutment surface parallel to said end surface and extending from the remote wall of the groove toward said bore, said abutment surface being located at a depth less than the width of the groove at said end surface, and a tool receiving recess in the bottom of the groove extending inwardly of the nut body from said abutment surface and being located between said abutment surface and the wall of said groove adjacent said bore, a sheet metal panel in face-to-face engagement with the end surface of said nut body at the side of the groove remote from said bore, said panel having a thickness less than the width of said groove at said end surface and having an integral portion bent downwardly from said end surface along the wall of said groove remote from said bore and engaging said abutment surface, said panel in the region of the juncture between said end surface and the remote wall of said groove being compressed to approximately one-half of its original thickness.

6. An interlocked nut and panel assembly as defined in claim 5 wherein the angle of divergence of said wall remote from said bore is between 10° and 20°.

7. An interlocked nut and panel assembly as defined in claim 5 wherein said groove is of an annular configuration completely surrounding said tapped bore, the metal of said panel inwardly of said groove from the compressed portion being expanded to a continuous annular band having a circumference greater than the circumference of the outer wall of said groove at said end surface of said nut body.

8. An interlocked nut and panel assembly as defined in claim 7 wherein the inner wall of said groove, said annular band of panel metal, and said outer wall of said groove are concentric with the axis of the tapped bore, and means locking said nut against rotation about said axis relative to said panel.

9. An interlocked nut and panel assembly as defined in claim 7 wherein said inner wall of said groove is concentric with the axis of the tapped bore, said annular band of panel metal and said outer wall of said groove extending around said axis in a symmetrical non-circular relationship thereto.

10. A nut adapted to be secured to a sheet metal panel having a thickness falling within a known range, comprising: a nut body having a generally flat panel engaging end surface and a tapped bore extending through the nut body along an axis normal to said end surface, means defining a panel metal receiving groove extending into said nut body from said end surface at opposite sides of said tapped bore, the groove having an inner side wall at the side of the groove adjacent the tapped bore extending inwardly of said nut body generally perpendicular to said end surface, the opposite side of said groove being defined by an outer side wall extending inwardly from said flat end surface in divergent relationship to said inner side wall at an angle between ten and twenty degrees and terminating in an abutment wall at a depth less than the width of said groove adjacent said outer side wall, said abutment wall terminating in a tool receiving recess at said inner side wall at a depth greater than (1) the width of said groove and (2) the depth of said abutment wall adjacent said opposite side wall.

11. A nut as defined in claim 10, wherein said tool receiving recess is defined by a distinct stepped recess having a side wall extending inwardly from said abutment wall, opposite said inner side wall, and a bottom wall adjacent said inner side wall.

12. A nut as defined in claim 11, wherein said stepped recess has a width equal to approximately one-half of the total width of said abutment wall.

13. A nut as defined in claim 10, wherein said abutment wall includes a flat panel abutment surface, adjacent said outer side wall, generally parallel to said end surface of the nut body, and said tool receiving recess is defined by a side wall extending inwardly relative to said end surface of the nut body from said abutment surface and a bottom wall adjacent said inner wall of the groove.

14. The nut as defined in claim 13, wherein said tool receiving recess is defined by a beveled wall inclined inwardly from said flat panel abutment surface toward said inner side wall, and a flat bottom wall extending between said inner side wall and said beveled wall.

15. A nut as defined in claim 10, wherein said abutment wall, including said tool receiving recess, is defined by a single beveled surface inclined inwardly from said outer side wall of the groove to said inner side wall.

16. An interlocked nut and panel assembly comprising: a nut body having a tapped bore and a generally flat end surface normal to the axis of said bore, means defining a groove in said nut body opening at said end surface at opposite sides of said bore, the inner side wall of the groove adjacent said bore being normal to said end surface and the outer side wall of the groove remote from the bore diverging from the bore in its extent inwardly of said body from said end surface, the bottom of the groove being defined by an abutment wall extending from said outer side wall to said inner side wall of the groove, said abutment wall at said outer side wall at a depth less than the width of said groove at said end surface and defining a tool receiving recess adjacent said inner side wall at a depth greater than (1) the width of said groove and (2) the depth of said groove adjacent said outer side wall, a sheet metal panel in face-to-face engagement with said end surface of said nut body at the side of the groove remote from said bore, said panel having a thickness less than the width of said groove at said end surface and having an integral portion bent downwardly from said end surface along the outer side wall of said groove remote from said bore and engaging said abutment wall adjacent said outer side wall, said panel in the region of the juncture between said end surface and the remote outer side wall of said groove being compressed to approximately one-half of its original thickness.

17. An interlocked nut and panel assembly as defined in claim 16, wherein the angle of divergence of said outer side wall remote from said bore is between ten and twenty degrees.

18. An interlocked nut and panel assembly as defined in claim 16, wherein said abutment wall is beveled inwardly from said outer side wall of the groove to said inner side wall, defining said tool receiving recess at said inner side wall.

19. An interlocked nut and panel assembly as defined in claim 16, wherein said abutment wall includes a flat abutment surface at said outer side wall of the groove generally parallel to said end surface of the nut body.

20. An interlocked nut and panel assembly as defined in claim 19, wherein said tool receiving recess is defined by a beveled wall inclined inwardly from said abutment surface, toward said inner side wall and a flat bottom wall extending from said beveled wall to said inner side wall.

* * * * *